United States Patent
Mott

[15] 3,657,782
[45] Apr. 25, 1972

[54] PROCESS FOR AIR ROLLER MANUFACTURE

[72] Inventor: Lambert H. Mott, c/o Mott Metallurgical, P.O. Drawer "L", Farmington, Conn. 06032

[22] Filed: Dec. 7, 1970

[21] Appl. No.: 95,604

[52] U.S. Cl..................29/148.4 D, 29/116, 29/149.5 A, 29/149.5 PM, 29/420.5
[51] Int. Cl....................B23p 11/00, B23d 53/10, B22f 3/24
[58] Field of Search..........29/148.4 D, 149.5 A, 116, 420.5, 29/163.5 F, 149.5 PM

[56] References Cited

UNITED STATES PATENTS

| | | | |
|---|---|---|---|
| 2,359,386 | 10/1944 | Reinsch | 29/DIG. 31 |
| 2,695,231 | 11/1954 | Causley | 29/149.5 PM |
| 3,033,783 | 5/1962 | Lubben | 29/420.5 |
| 3,349,462 | 10/1967 | Mott | 29/116 |

Primary Examiner—Thomas H. Eager
Attorney—Peter L. Tailer

[57] ABSTRACT

An air roller is constructed using the steps of forming a cylindrical porous metal core by bonding more porous end portions on a less porous center section, fixing the core on a shaft containing air passages leading to the center section and the end portions, rotating the shaft to grind the outer surface of the core to close tolerances and close its pores, coating the ground ends of the outer surface of the core to prevent etching, etching the uncoated center of the outer surface to open pores therein, and placing an outer cylindrical shell having end flanges about the core, and end flanges containing air escape apertures so that air escaping through the etched portion of the center section radially supports the shell and air escaping through the more porous end portions longitudinally supports the shell.

3 Claims, 8 Drawing Figures

PATENTED APR 25 1972 3,657,782

INVENTOR:
LAMBERT H. MOTT
BY Peter S. Tailer
ATTORNEY

PROCESS FOR AIR ROLLER MANUFACTURE

BACKGROUND OF THE INVENTION

1. Field of the Invention

In one application, air rollers are used in textile machines to guide or pass filaments thereover as air rollers do not wear at high speeds and require replacement. However, the volume of air required to support a roller for rotation is critical as providing a large volume of air is difficult and not economically feasible. The process of this invention provides a more efficient air roller.

2. Description of the Prior Art

This application is an improvement of my U.S. Pat. No. 3,349,462 issued Oct. 31, 1967, entitled AIR ROLLER.

SUMMARY OF THE INVENTION

An air roller is assembled in the following manner. A porous metal cylindrical core is made from a center section of lesser porosity and end portions of greater porosity, the center section and the end portions containing axial bores. The end portions are glued, as with an epoxy cement, to the center section with the cement stopping the pores of the core at the ends of the center section. A shaft is pressed into the axial bore of the assembled core, the shaft containing air passages leading to the end portions and the center section of the core. The shaft is rotated between centers to grind the outer surface of the porous core to a final close tolerance diameter while smearing and stopping the pores of the outer surface. The ends of the outer surface of the core are then coated with an acid resistant material, such as wax, leaving an uncoated center portion of the outer surface. The core is placed in or otherwise treated with an acid to etch open the pores in the center portion of the outer surface. The core is then removed from the acid and the wax or other acid resistant material removed. A cylindrical outer shell having end flanges containing air escape passages is placed about the core.

The process of this invention allows extremely fine tolerances to be obtained between between the core and the rotating shell to reduce the amount of air required to float the shell for rotation. This radial clearance may be held between 0.0001 to 0.0002 inch. The less porous end portions of the core provide cushions of air to position the flanges of the shell axially so that the air roller will operate in any position from the horizontal to the vertical without setting up an "air hammer" or chattering action. The clearance between the end portions and the flanges of the shell varies between 0.001 and 0.010 inch for maximum efficiency.

DESCRIPTION OF THE PREFERRED EMBODIMENT

Figure 1:
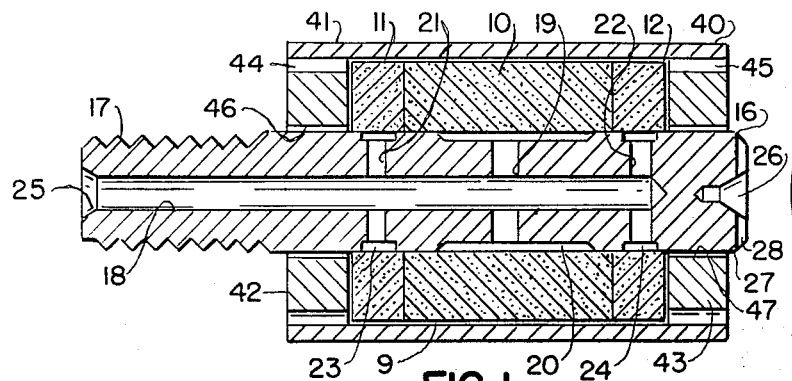
FIG. 1 is a longitudinal section through an air roller according to my invention.
Figure 2:
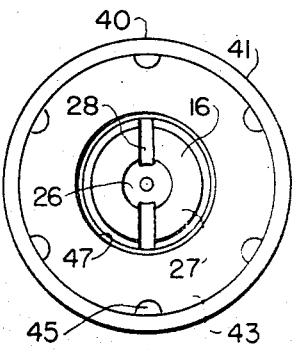
FIG. 2 is an end view of the air roller of FIG. 1.
Figures 3, 4:
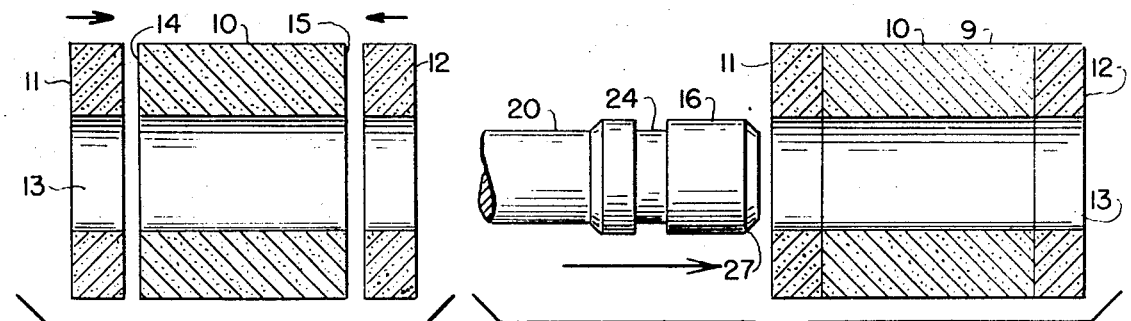
FIG. 3 is a longitudinal section through positioned elements of an air roller core prior to their being glued together.
FIG. 4 is a longitudinal section through glued elements of the porous core with a broken away portion of a shaft being inserted therein.

As shown in FIGS. 1-7, the air roller of this invention is manufactured in the following manner. FIG. 3 shows a center section 10 and two end portions 11 and 12 of porous metal, the center section 10 and the two end portions 11 and 12 containing an axial bore 13. The end surfaces 14 and 15 of the center section 10 are coated with an epoxy adhesive or the like and have the end portions 11 and 12 glued thereon as shown in FIG. 4 to form the porous metal core 9. The glue, cement, or adhesive used seals the pores of the center section 10 and the end portions 11 and 12 in the area of the bond. This prevents any longitudinal flow of air from center section 10 to end portions 11 and 12. Center section 10 is preferably of a more dense or less porous consistency than end portions 11 and 12.

As may be seen in FIGS. 1 and 4, a shaft 16 has a threaded end 17 through which there extends a blind central air passage 18 terminating in shaft 16. A through bored lateral passage 19 leads from passage 18 to a central annular channel 20. Through bored lateral passages 21 and 22 lead to the annular channels 23 and 24 disposed on each side of channel 20. The ends of shaft 16 contain conical surfaces 25 and 26 to receive centers for turning. The end 27 of shaft 16 opposite threaded end 17 contains a screwdriver slot 28. Shaft 16 is pressed into bore 13 of core 9 so that annular channel 20 is disposed under center section 10 and the annular channels 23 and 24 are disposed, respectively, under end portions 11 and 12.

Figure 5:
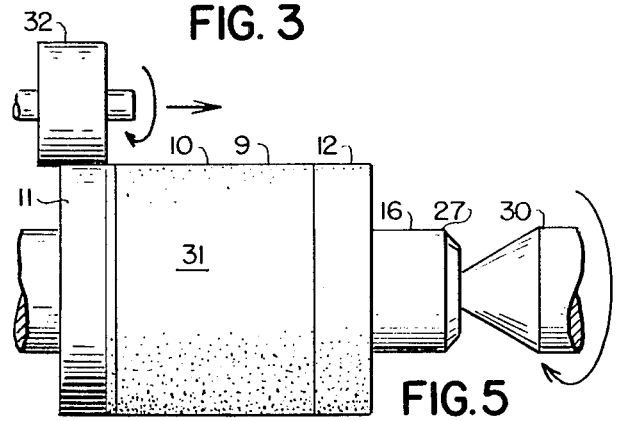
FIG. 5 is a side view of a core mounted on a shaft having one end broken away, the shaft being turned between centers to grind the outer surface of the core.

As shown in FIG. 5, shaft 16 is turned between centers 30, or in any other manner, as the outer surface 31 of core 9 is ground by an abrasive wheel 32 to an exact final outer diameter. The grinding completely smears the pores to essentially close the entire outer surface 31 of core 9 to air flow therethrough.

Figure 6:
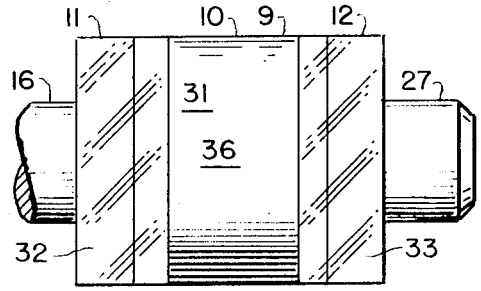
FIG. 6 is a side view of a ground core mounted on a fragment of a shaft, the ends of the ground outer surface of the core being coated with an acid resistant material.
Figure 7:
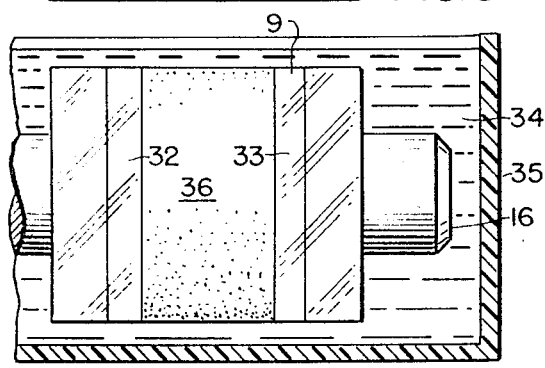
FIG. 7 is a longitudinal section through an acid bath containing a core mounted on a shaft, the acid opening pores closed by grinding in the center portion of the outer surface of the core, an end of the acid bath and the shaft being broken away.

As shown in FIG. 6, at least the ends of surface 31 are coated by wax films 32 and 33 to resist etching by an acid. As may further be seen in FIG. 7, an acid solution 34 in tank 35 etches the pores open in the uncoated center portion 36 of the outer surface 31. Any suitable etching resistant coating 32 and 33 may be used such as wax which may be later removed by heating or by solvents. The wax may also be applied to shaft 16 if required to prevent its attack by the etching agent. Any suitable acid or etching agent may be used which attacks the metal of the porous center section 10 of core 9. The acid may be painted, sprayed, or otherwise applied as well as the dipping shown in FIG. 7.

As shown in FIGS. 1 and 2, a shell 40 has a cylindrical sleeve 41 with end flanges 42 and 43 pressed therein. End flanges 42 and 43 contain the peripheral air escape apertures 44 and 45 and the central bores 46 and 47 to accommodate shaft 16 and also allow the escape of some air. When air is introduced at from 5 to 50 pounds pressure into passage 18, shell 40 is supported to rotate freely.

This method of manufacture allows the clearance between the core 9 and the sleeve 41 to be held between 0.0001 and 0.0002 inch while sealing the ends of outer surface 31 against the passage of air. The end portions 11 and 12 may be of a more porous metal to provide the greater air flow required to enable the air roller to operate in any position. While shaft 16 is described as pressed into bore 13, it may be inserted and otherwise fixed as by careful cementing which does not block the pores of core 9 above the annular channels 20, 23 and 24.

Figure 8:
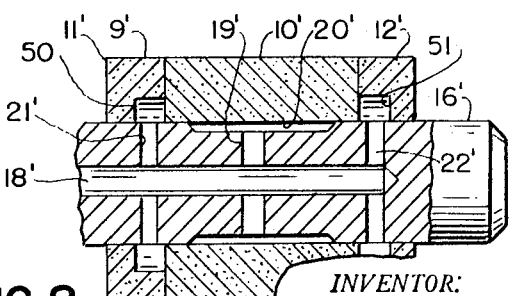
FIG. 8 is a longitudinal section through a modified air roller core mounted on a shaft, portions of the shaft and the core being broken away.

FIG. 8 shows a modification of this invention in which shaft 16' has an axial air passage 18', a through transverse passage 19' leading to annular channel 20', and two lateral through passages 21' and 22'. Center section 10' has two end portions 11' and 12' glued thereto, however end portions 11' and 12' contain the inward facing annular channels 50 and 51 which provide air flow through the ends of the core 9'. The glue or cement which joins the end portions 11' and 12' to center section 10' coats the entire end surfaces of center section 10' to prevent the flow of air through them.

As one example of the efficiency of this invention, an air roller having a shell 40 0.500 inch in diameter and 0.765 inch in length was supported for rotation with a requirement of less than 1,000 cc of air per minute at 10 psi. The etched area 36 of the core 9 of this roller was 0.250 inch wide. The center section 10 was of 300 Series stainless steel powder 10 to 15 micron mean particle size compacted to a density of 65 to 70 percent. The end portions 11 and 12 were of 300 Series stainless steel powder of 50 to 75 micron size compacted to a density of 65 to 70 percent.

What is claimed is:

1. In the process of manufacturing an air roller, the steps of;
   a. forming a porous metal cylindrical core containing an axial bore by cementing end portions on a center section and allowing cement to block pores of the ends of the center section;
   b. mounting the core on a shaft containing air passages leading to the center section and the end portions of the core;
   c. rotating the shaft and finishing the outer surface of the core to a final finish dimension allowing the finishing to smear and close pores of the outer surface of the core;
   d. coating the ends of the outer surface of the core with an etching resistant material;
   e. etching the uncoated center portion of the outer surface of the core to open pores therein;
   f. removing the coating applied in step (d); and
   g. placing a cylindrical shell having end flanges about the porous metal core.

2. The process according to claim 1 wherein in step (a) the end portions are of a greater porosity than the center section.

3. The process according to claim 1 wherein in step (c) the finishing of the outer surface of the core is by grinding.

* * * * *